United States Patent
Zhukauskas

(12) 
(10) Patent No.: US 12,501,894 B2
(45) Date of Patent: Dec. 23, 2025

(54) TISSUE PRESERVATION SOLUTION, TISSUE PRESERVATION SYSTEM, AND METHODS OF PRESERVING TISSUE

(71) Applicant: Axogen Corporation, Alachua, FL (US)

(72) Inventor: Rasa Zhukauskas, Gainesville, FL (US)

(73) Assignee: AXOGEN CORPORATION, Alachua, FL (US)

(\*) Notice: Subject to any disclaimer, the term of this patent is extended or adjusted under 35 U.S.C. 154(b) by 491 days.

(21) Appl. No.: 18/051,410

(22) Filed: Oct. 31, 2022

(65) Prior Publication Data
US 2023/0189791 A1    Jun. 22, 2023

Related U.S. Application Data

(60) Provisional application No. 63/373,827, filed on Aug. 29, 2022, provisional application No. 63/265,880, filed on Dec. 22, 2021.

(51) Int. Cl.
*A01N 1/126* (2025.01)
*A01N 1/124* (2025.01)
*A01N 1/162* (2025.01)
*A01N 1/168* (2025.01)

(52) U.S. Cl.
CPC ............ *A01N 1/126* (2025.01); *A01N 1/124* (2025.01); *A01N 1/162* (2025.01); *A01N 1/168* (2025.01)

(58) Field of Classification Search
None
See application file for complete search history.

(56) References Cited

U.S. PATENT DOCUMENTS

| 2008/0176205 A1* | 7/2008 | Shelby ............... A01N 1/10 435/325 |
| 2015/0352235 A1 | 12/2015 | Malinin |
| 2020/0390088 A1 | 12/2020 | Sadik |

FOREIGN PATENT DOCUMENTS

GB    2569753 A    *    6/2019    ............    A01N 1/021

OTHER PUBLICATIONS

IGL, Celsior Flushing and Cold Storage Solution for Heart Preservation, 2023, IGL New Chances Matter, pp. 1-4 (Year: 2023).*
International Search Report and Written Opinion in Application No. PCT/US2022/078996, dated Feb. 23, 2023 (17 pages).
Nakamoto, João Carlos MD et al., "Evaluation of the Use of Nerve Allograft Preserved in Glycerol", Plastic and Reconstructive Surgery—Global Open, 2021, vol. 9, No. 4 (8 pages).
Ikeguchi, et al., "Successful storage of peripheral nerves using University of Wisconsin solution with polyphenol", Journal Neurosci Methods, 2007, vol. 159, pp. 57-65 (9 pages).
Qizhi Huang et al., "Banking of non-viable skin allografts using high concentrations of glycerol or propylene glycol", Cell and Tissue Banking, 2004;5(1): pp. 3-21 (19 pages).
Gisele G. Tawil et al., "Potentiation of Chlorhexidine by Propylen Glycol", Alexandria Journal of Pharmaceutical Sciences, vol. 2, No. 1, Mar. 1988, pp. 58-60 (3 pages).
Xue-yuan Li et al., "One-stage human acellular nerve allograft reconstruction for digital nerve defects", Neural Regeneration Research, Jan. 2015, vol. 10, Issue 1, pp. 95-98 (4 pages).

\* cited by examiner

*Primary Examiner* — Tracy Vivlemore
*Assistant Examiner* — Hanna Marie Thueson
(74) *Attorney, Agent, or Firm* — BOOKOFF MCANDREWS, PLLC

(57) ABSTRACT

A method for preserving a tissue graft includes submerging the tissue graft in a solution containing one or more antimicrobial and/or stabilizing agents and storing the tissue graft in the solution for a period of time of at least 24 hours while the solution is in an unfrozen state. A tissue preservation system includes a solution containing one or more antimicrobial and/or stabilizing agents and a tissue graft in the solution.

22 Claims, 9 Drawing Sheets

TISSUE PRESERVATION SOLUTION, TISSUE PRESERVATION SYSTEM, AND METHODS OF PRESERVING TISSUE

CROSS-REFERENCE TO RELATED APPLICATIONS

This patent application claims the benefit of priority to U.S. Provisional Patent Application No. 63/265,880, filed on Dec. 22, 2021, and U.S. Provisional Patent Application No. 63/373,827, filed on Aug. 29, 2022, the entireties of which are incorporated by reference herein.

TECHNICAL FIELD

The present disclosure relates generally to the fields of neurobiology and medicine. More particularly, the present disclosure relates to solutions for preservation of tissue, such as nerve grafts, tissue preservation systems, and methods of preserving tissue, such as nerve grafts.

BACKGROUND

Nerve damage, regardless of cause, may result in significant, and in some cases severe, discomfort for a subject. Neuropathic injury, in particular, can cause chronic pain, loss of sensation, loss of some or all muscle control, or other undesirable effects. One potential treatment of nerve injuries is surgical intervention via autologous tissue replacement, in which nerve tissue from an uninjured region is grafted to a damaged region of a nerve. While autologous nerve grafting is considered a gold standard for repair of nerve defects, and in particular, for repair of peripheral nerve damage, there are significant disadvantages associated with autologous nerve grafting, such as donor site trauma, increased complexity of the grafting procedure, scarring, and sensory loss at the donor site, among others.

While neurons of the peripheral nervous system may have an increased regenerative ability as compared to nerves of the central nervous system, many nerve injuries are unable to heal sufficiently without surgical intervention. For example, when an injury results in a lack of sufficient nerve tissue to allow tension-free healing of the peripheral nerve, surgical intervention may be recommended to increase the likelihood of successful nerve regeneration and return of sensation or muscle control. While surgical intervention is quite successful in some circumstances, the peripheral nerve regeneration process is complex and affected by multiple factors, such as the microenvironment involved in nerve regeneration. Due at least in part to this complexity, there are numerous circumstances where surgical intervention is less than fully successful.

Allografts offer an alternative to autografts and may be implanted at sites in which there is insufficient nerve tissue present to allow healing without intervention. Allografts, as well as nerve xenografts, can be processed to provide a suitable substrate for nerve regeneration. However, allografts or xenografts may present challenges. For example, it is frequently desirable to prepare and store allograft or xenograft tissue for use as an implant before the implant is needed. However, tissue can experience degradation when stored for relatively long periods of time. While this degradation can be slowed by cryopreservation, cryopreservation introduces additional and different complications. For example, preservation of tissue at reduced temperatures requires careful temperature monitoring and introduces increased costs associated with specialized refrigeration equipment needed to transport and store the cryopreserved tissue. Other preservation processes, such as tissue lyophilization, involve rehydration of tissue and can cause degradation of the tissue when rehydration fails to adequately restore tissue structures.

SUMMARY

In accordance with the present disclosure, a solution may be useful for preservation and/or rehydration of tissue, such as a nerve graft. The solution may enable room temperature storage of the tissue. The solution may be useful for rehydration of lyophilized tissue and may prevent damage to one or more structures of the tissue.

In one aspect, a method for preserving a tissue graft may include submerging the tissue graft in a solution containing one or more antimicrobial and/or stabilizing agents and storing the tissue graft in the solution for a period of time of at least 24 hours while the solution is in an unfrozen state.

In another aspect, a method for preserving a tissue graft may include submerging the tissue graft in a solution containing chlorhexidine gluconate and propylene glycol and storing the tissue graft in the solution for a period of time of at least 24 hours, the solution being in an unfrozen state.

In another aspect, a method for rehydrating a tissue graft may include storing the tissue graft in a dehydrated state for at least 24 hours, and submerging the tissue graft in a solution containing one or more antimicrobial and/or stabilizing agents.

In another aspect, a tissue preservation system may include a solution containing one or more antimicrobial and/or stabilizing agents and a tissue graft in the solution.

In yet another aspect, a tissue preservation system may include a solution containing chlorhexidine gluconate and propylene glycol and a tissue graft in the solution.

Other objects, features, and advantages of the present disclosure will become apparent from the following detailed description. It should be understood, however, that the detailed description and the examples, while indicating exemplary embodiments of the present disclosure, are given by way of illustration only, since various changes and modifications within the spirit and scope of the invention will become apparent to those skilled in the art from this detailed description. Note that simply because a particular compound is ascribed to one generic formula does not mean that it cannot also belong to another generic formula.

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±10% of a specified amount or value unless indicated otherwise in the specification. The use of the term "or" in the claims and specification is used to mean "and/or" unless explicitly indicated to refer to alternatives only or the alternatives are mutually exclusive, although the disclosure supports a definition that refers to only alternatives and "and/or." As used herein "another" may mean at least a second or more.

Both the foregoing general description and the following detailed description are exemplary and explanatory only and are not restrictive of the features, as claimed. As used herein, the terms "comprises," "comprising," "including," "having," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." In addition, the term "between" used in describing ranges of values is intended to include the minimum and maximum values described herein.

The terms and expressions which have been employed are used as terms of description and not of limitation, and there is no intention that in the use of such terms and expressions of excluding any equivalents of the features shown and described or portions thereof, but it is recognized that various modifications are possible within the scope of the disclosure claimed.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of exemplary embodiments presented herein.

DETAILED DESCRIPTION

Figure 1:
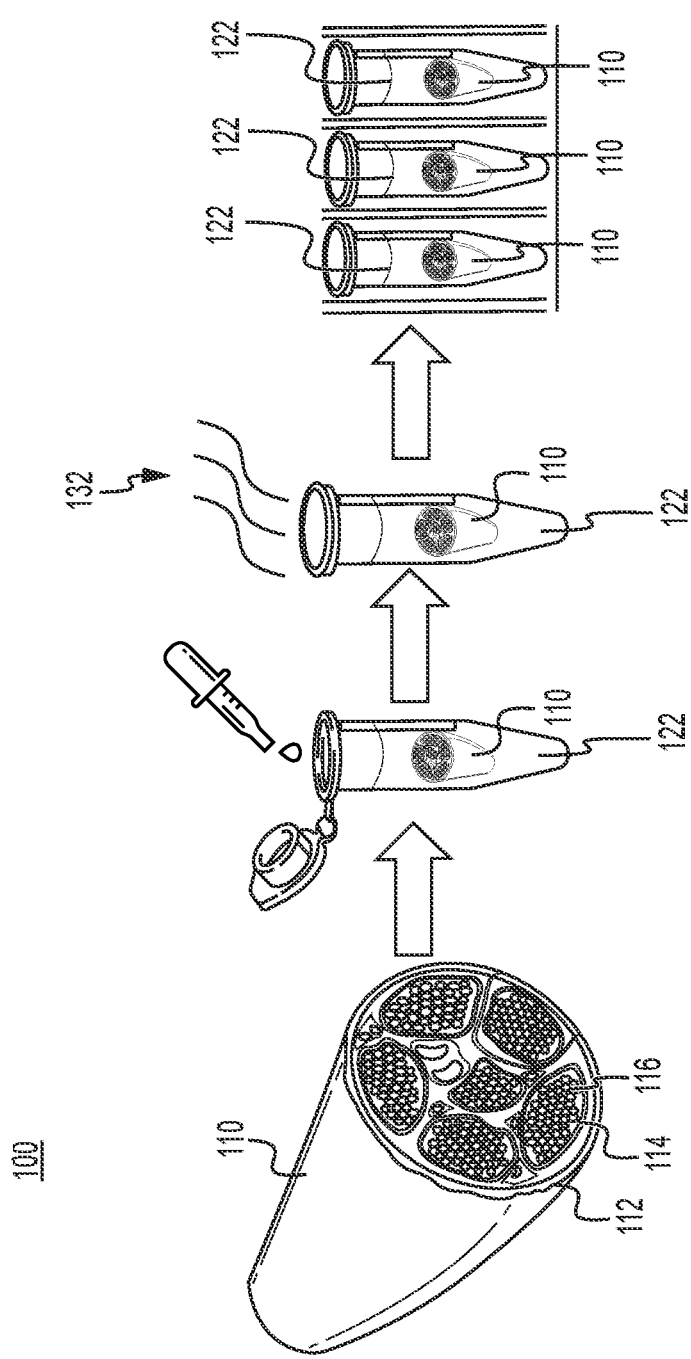
FIG. 1 shows a schematic diagram of an exemplary process for storing tissue or an implant, such as a nerve graft, according to aspects of the present disclosure.

Embodiments of the present disclosure are drawn to tissues, such as nerve grafts, and systems or processes for storing tissue, including processes for storing tissue at room temperature. The nerve grafts may be stored at room temperature, or in a refrigerated environment. The nerve grafts may be placed in a solution and stored in a hydrated state. Additionally or alternatively, nerve grafts may be frozen, lyophilized, stored in a lyophilized state, and rehydrated with a solution. The nerve grafts, whether stored in a hydrated state, or after being rehydrated, may be placed on or implanted into a subject, may be useful for laboratory experimentation, and/or may be useful for demonstrations. In some aspects, the solution may contain one or more antimicrobial agents. The one or more antimicrobial agents may inhibit grown of one or more of bacteria, fungus, algae, *acanthamoeba*, or other impurities. The one or more antimicrobial agents may include chlorhexidine gluconate. The solution may include one or more stabilizing agents. The one or more stabilizing agents may include propylene glycol. The solution may include lactated ringer's solution (LRS), phosphate buffer saline (PBS), physiological saline, and/or deionized water. The solution may optionally be formed from one or more soluble salts. In some aspects, the contents of the solution may be biodegradable.

In some aspects, the tissue, e.g., nerve graft tissue, human or xenogeneic pericardium, intestinal submucosa, dermis, urinary bladder membranes, epineurium, vascular, or birth tissues, may be processed prior to being introduced to a preserving and/or rehydrating solution. Processed tissue suitable for embodiments of the present disclosure may be natural or synthetic. For example, the tissue may be soft biological tissue obtained from an animal, such as a mammal, including a human or a non-human mammal, or a non-mammal, including a fish, amphibian, or insect. The graft may be allogeneic or xenogeneic to a subject into which the graft is implanted. The tissue may be nerve tissue, including, for example, peripheral nerve tissue or central nervous system tissue. Other types of tissue suitable for the present disclosure include, but are not limited to, epithelial tissue, connective tissue, muscular tissue, vascular (e.g., capillary tissue), dermal tissue, skeletal tissue, smooth muscle tissue, cardiac tissue (e.g., pericardium), urological tissue (e.g., urinary bladder membranes), intestinal submucosa, birth tissue, ligament tissue, or adipose tissue. As mentioned above, the soft biological tissue may be mammalian tissue, including human tissue and tissue of other primates, rodent tissue, equine tissue, canine tissue, rabbit tissue, porcine tissue, or ovine tissue. In addition, the tissue may be non-mammalian tissue, selected from piscine, amphibian, or insect tissue. The tissue may be a synthetic tissue, such as, but not limited to, laboratory-grown tissue or 3D-printed tissue. According to some examples, the tissue is nerve tissue obtained from an animal, such as a human or a non-human mammal. The tissue may be obtained and/or treated as disclosed in U.S. patent application Ser. No. 17/411,718, entitled "Nerve Grafts and Methods of Preparation Thereof," filed on Aug. 25, 2021, the entirety of which is incorporated by reference. The tissue may be an implant and/or biomaterial as disclosed in U.S. Provisional Patent Application No. 63/292,681, entitled "Nerve Grafts Containing Regenerative Compounds, Methods of Making the Same, and Methods of Treatment Using the Same," filed on Dec. 22, 2021, U.S. Provisional Patent Application No. 63/265,858, entitled "Nerve Grafts Containing Regenerative Compounds, Methods of Making the Same, and Methods of Treatment Using the Same," filed on Dec. 22, 2021, U.S. Provisional Patent Application No. 63/265,860, entitled "Drug Delivery System and Methods of Using the Same," filed on Dec. 22, 2021, and/or U.S. Provisional Patent Application No. 63/265,861, entitled "Drug Delivery System and Methods of Using the Same," filed on Dec. 22, 2021, the entireties of which are incorporated by reference. In at least some embodiments, an exemplary tissue may be a processed human nerve allograph, such as an Avance® Nerve Graft from Axogen, Inc. (Alachua, FL, US).

Although embodiments of the disclosure are described in relation to nerve grafts for convenience, it is contemplated that other types of tissue, as described above, may be used in the methods and implants described herein. Further, embodiments of the disclosure focus on the use of a solution including an antimicrobial agent, such as chlorhexidine gluconate, and a stabilizing agent, such as propylene glycol, in conjunction with a tissue, but may include different antimicrobial agents, different stabilizing agents, additional antimicrobial agents, additional stabilizing agents, or may omit the antimicrobial agent or stabilizing agent.

Figure 2:
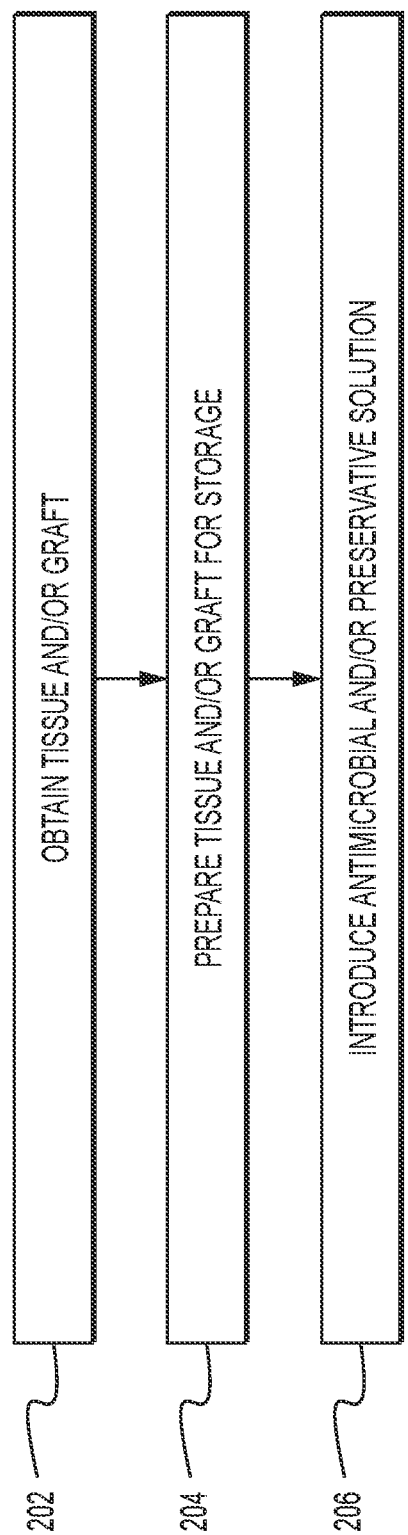
FIG. 2 shows a flowchart of an exemplary process for storing tissue or an implant, according to aspects of the present disclosure.

FIG. 1 illustrates a diagram of an exemplary process 100 for preserving tissue, such as nerve tissue useful as a nerve graft. In one or more aspects, nerve graft 110 may include one or more neuro-regenerative or immunosuppressive agents. The one or more neuro-regenerative or immunosuppressive agents may include an immunophilin ligand. The one or more neuro-regenerative or immunosuppressive agents may include FK506 (tacrolimus), rapamycin (sirolimus), or cyclosporine A. The one or more neuro-regenerative or immunosuppressive agents may include one or more other so-called "-olimus" drugs instead of, or in addition to, rapamycin. For example, the one or more neuro-regenerative or immunosuppressive agents may include temsirolimus, everolimus, ridaforolimus (deforolimus), biolimus, novolimus, zotarolimus, myolimus, and/or amphilimus. The nerve graft may be suitable for implantation in a human or non-human animal. FIG. 2 illustrates a flowchart of an exemplary process 200 for producing a preserved tissue, such as nerve graft 110. In particular, process 200 may enable storage of nerve graft 110 or other tissue at room temperature, as described below with respect to process 100 (FIG. 1).

Process 200 may include obtaining tissue, such as natural or synthetic tissue suitable for use with or as a nerve graft, preparing the tissue for storage, and submerging the tissue in a solution including one or more antimicrobial agents and/or stabilizing agents. The solution may enable storage of a nerve graft, e.g., in an unfrozen state, at room temperature or refrigerated temperature. As used herein, the phrase "room temperature" refers to temperatures of about 18 degrees Celsius to about 27 degrees Celsius, while "refrigeration temperature" refers to temperatures of about 0 degrees Celsius to about 18 degrees Celsius. As used herein, "frozen" refers to a state in which the solution in which the tissue is submerged is in a solid state, and "unfrozen" refers to a state in which the solution in which the tissue is submerged is in a liquid state. As used herein, "solution" encompasses both the frozen (solid) state or the liquid state of the mixture.

While process 200 is described in conjunction with process 100 and FIG. 1 below, as understood, process 200 may include fewer steps, additional steps, and/or different steps as compared to process 100. Additionally, process 200 may include fewer steps, additional steps, and/or different steps as compared to each block (e.g., steps 202, 204, and 206) illustrated in FIG. 2, or the specific order of the steps may be different.

In a step 202 (FIG. 2) of process 200, a nerve graft 110 (FIG. 1) may be obtained. A suitable nerve graft may have been harvested from an animal, such as a mammal, e.g., a human or a non-human mammal, or non-mammalian tissue as described above. This nerve graft may have been preprocessed and may be suitable for immediate use in a subject (e.g., implantation) or suitable for storage and subsequent use in a subject. In one example, step 202 may include obtaining a nerve graft 110 that has been processed so as to inhibit an immunogenic reaction in a subject, as well as processed so as to promote proliferation of nerve cells from subject tissue into nerve graft 110 following implantation.

In at least some aspects, step 204 may include processing nerve graft 110. Suitable processing of this nerve tissue, or other tissue used for nerve graft 110, may include removal of at least some cellular material or other biological materials. Suitable processing techniques (e.g., mechanical processing, chemical processing, or a combination of both) may allow a portion or an entirety of the extracellular matrix ("ECM") to remain intact, such that processed nerve graft 110 forms a scaffold for infiltration of nerve cells.

An exemplary processed nerve graft 110 may have been prepared for use as an allograft. This preparation may include harvesting tissue from a donor (e.g., from a cadaver), and processing the tissue, e.g., by decellularizing the tissue, among other steps. For example, nerve graft 110 may be Axogen's Avance® Nerve Graft. The decellularized tissue may include decellularized material corresponding to an epineurium 112, perineurium 114, and endoneurium 116, such that nerve graft 110 contains one or more structures that correspond to structures of a native nerve. The decellularized tissue may be suitable, in particular, for implantation in a human for repair of a nerve, e.g., a peripheral nerve injury. In one or more aspects, the use of a solution including one or more antimicrobial agents and/or one or more stabilizing agents may enable storage of nerve graft 110 without significant degradation of structures, such as epineurium 112, perineurium 114, and/or endoneurium 116.

In order to facilitate use of processed nerve graft 110, decellularizing may include removal of at least some cellular and noncellular components that may cause or increase an immunological response or other adverse response in a subject. Decellularizing may be performed by any combination of suitable chemical and enzymatic processing. An exemplary methodology suitable for processing tissue to produce nerve graft 110, including decellularizing to produce acellular nerve tissue, is described in U.S. Pat. No. 9,572,911, entitled "Method for Decellularization of Tissue Grafts," which issued on Feb. 21, 2017, the entire disclosure of which is incorporated herein by reference. It will be appreciated, however, that various other methods for preparing tissue specimens may be used. As understood, steps 202 and 204 may be performed by obtaining preprocessed tissue and/or a preprocessed graft.

Step 206 may include introducing a solution 122 to nerve graft 110 by adding solution 122 to nerve graft 110 or by adding nerve graft 110 to solution 122. Regardless of whether solution 122 is added to nerve graft 110 or nerve graft 110 is added to solution 122, nerve graft 110 may be submerged in solution 122. As used herein, the term "submerged" means completely or partially surrounded by a fluid. Solution 122 may include one or more constituents configured to facilitate storage of nerve graft 110 by inhibiting degradation of nerve graft 110. Solution 122 may inhibit degradation of nerve graft 110 by reducing the proliferation of microorganisms. For example, solution 122 may include one or more antimicrobial agents and/or one or more stabilizing agents. Solution 122 may include one or more components, such as a salt solution including one or more of lactated ringer's solution (LRS), phosphate buffer saline (PBS), and/or physiological saline, and/or another component, such as deionized water. The LRS, PBS, physiological saline, and/or deionized water may form a majority of solution 122 by weight. Solution 122 may also include one or more soluble salts of, for example, magnesium, sodium, calcium, and/or potassium. In particular, solution 122 may be formed from one or more of magnesium sulfate, magnesium chloride hexahydrate, sodium chloride, sodium hydrogen carbonate, calcium chloride, ammonium phosphate dibasic, Trisma hydrochloride, monobasic potassium phosphate, and/or potassium chloride. When one or more salts are introduced to solution 122, the salt may have suitable cationic and anionic components, such that the added salt is able to stabilize pH, stabilize protein function, and/or maintain biological activity of proteins present in nerve graft 110.

When solution 122 includes magnesium sulfate, the magnesium sulfate may be added to solution 122 in an amount of about 0.01 g/L to about 1 g/L. When solution 122 includes magnesium chloride hexahydrate, the magnesium chloride hexahydrate may be added to solution 122 in an amount of about 0.01 g/L to about 1 g/L. When solution 122 includes sodium chloride, the sodium chloride may be added to solution 122 in an amount of about 5 g/L to about 50 g/L. When solution 122 includes sodium hydrogen carbonate, the sodium hydrogen carbonate may be added to solution 122 in an amount of about 0.5 g/L to about 5 g/L. When solution 122 includes calcium chloride, the calcium chloride may be added to solution 122 in an amount of about 0.2 g/L to about 0.8 g/L. When solution 122 includes ammonium phosphate dibasic, the ammonium phosphate dibasic may be added to solution 122 in an amount of about 0.5 g/L to about 5 g/L. When solution 122 includes Trisma hydrochloride, the Trisma hydrochloride may be added to solution 122 in an amount of about 0.1 g/L to about 1 g/L. When solution 122 includes monobasic potassium phosphate, the monobasic potassium phosphate may be added to solution 122 in an amount of about 0.01 g/L to about 0.1 g/L. When solution 122 includes potassium chloride, the potassium chloride may be added to solution 122 in an amount of about 0.01 g/L to about 0.5 g/L.

Solution 122 may include one or more additives that facilitate preservation of the structure of nerve graft 110 and/or prevent protein degradation. For example, solution 122 may include glycerol and/or dimethyl sulfoxide (DMSO). However, in at least some embodiments, solution 122 may be free or substantially free of DMSO.

Solution 122 may be a colorless liquid and may remain colorless in the presence of nerve graft 110. In some aspects, solution 122 may have a light yellow color. Solution 122 may have a pH between about 4.0 to about 8.0, or between about 5.0 to about 7.0. Solution 122 may be odorless.

The one or more antimicrobial agents may include chlorhexidine gluconate. Solution 122 may contain chlorhexidine gluconate in an amount of about 0.0005% by weight to about 2% by weight. Solution 122 may be diluted before nerve graft 110 is submerged in solution 122, or while nerve graft 110 is in the presence of solution 122. Prior to dilution, chlorhexidine gluconate may be present in an amount of about 0.1% by weight to about 10% by weight, in an amount of about 0.2% by weight to about 5% by weight, or in an amount of about 0.5% by weight to about 2% by weight. Following dilution, chlorhexidine gluconate may be present in solution 122 in an amount of about 0.0005% by weight to about 0.01% by weight, or in an amount of about 0.001% by weight to about 0.005% by weight. The one or more antimicrobial agents may include one or more alcohols or parachlorometaxylenol, either instead of or in addition to chlorhexidine gluconate.

The one or more stabilizing agents may include propylene glycol. Solution 122 may contain propylene glycol in an amount of about 0.001% by weight to about 50% by weight. As noted above, solution 122 may be diluted before nerve graft 110 is submerged in solution 122, or after nerve graft 110 is in the presence of solution 122. Prior to dilution, propylene glycol may be present in an amount of about 1% by weight to about 30% by weight, or from an amount of about 5% by weight to about 15% by weight. Following dilution, propylene glycol may be present in an amount of about 0.001% by weight to about 0.5% by weight, or from about 0.01% by weight to about 0.05% by weight. The one or more stabilizing agents may include one or more of propanediol, glycerin, or butylene glycol, either instead of or in addition to propylene glycol.

When solution 122 includes chlorhexidine gluconate and propylene glycol, solution 122 may include less chlorhexidine gluconate than propylene glycol, as measured by weight. In particular, the ratio of chlorhexidine gluconate to propylene glycol may be about 1:100 by weight to about 1:2 by weight, for example, 1:50 to about 1:4 by weight, or 1:25 to about 1:10 by weight. In some aspects, the amount of chlorhexidine gluconate maybe be about the same as the amount of propylene glycol, (i.e., about 1:1 by weight). In some aspects, the ratio of chlorhexidine gluconate to propylene glycol may be about 1:100 by weight, about 1:50 by weight, about 1:25 by weight, about 1:15 by weight, about 1:10 by weight, about 1:4 by weight, or about 1:2 by weight. If desired, the amount of chlorhexidine gluconate may be larger than the amount of propylene glycol. For example, the ratio of chlorhexidine gluconate to propylene glycol may be about 2:1 by weight, about 10:1 by weight, about 50:1 by weight, about 100:1 by weight, or about 500:1 by weight.

Nerve graft 110 may be submerged in solution 122 by placing solution 122 and nerve graft 110 in a suitable container. This container may include, for example, a vial, a well of a tray, packaging in which nerve graft 110 may be stored prior to use, or any other suitable container. In at least some embodiments, step 206 may include placing the nerve graft 110, together with solution 122, in a suitable packaging for wet-preservation of the nerve graft 110. The quantity of solution 122 may be based, at least in part, on the size of the container and/or the size of nerve graft 110. For example, the quantity of solution 122 may be about 500 µL to about 50 mL, about 500 µL, about 1 mL, about 5 mL, about 10 mL, about 15 mL, about 20 mL, about 30 mL, or about 50 mL. The packaging may be translucent or may be opaque, so as to prevent most or all light infiltration.

Following step 206, nerve graft 110 may be prepared for sterilization and sterilized. As discussed above, nerve graft 110 may be placed within a container together with solution 122, and nerve graft 110 may be sterilized while in this container, e.g., a vial, tray, or packaging, in which this nerve graft was first submerged in solution 122. Alternatively, nerve graft 110 may be placed within a different container, e.g., a specialized sterilization container, during sterilization.

Sterilization may be performed while nerve graft 110 is in the presence of solution 122. Sterilization may be performed while solution 122 and nerve graft 110 are at room temperature or at a temperature below room temperature. In some aspects, nerve graft 110 and solution 122 may be temporarily frozen during the sterilization process. Freezing may be performed to inhibit microbial action prior to sterilization such that, following sterilization, microbial action is further inhibited by the antimicrobial agent or agents in the sterilized solution 122, or fully arrested by the antimicrobial agent or agents in the sterilized solution 122. Nerve graft 110 and solution 122 may be frozen by reducing the temperature of nerve graft 110 and solution 122 to below 0 degrees Celsius following the introduction of solution 122 to graft 110, or the introduction of graft 110 to solution 122. In particular, nerve graft 110 and solution 122 may be held at a temperature of at or above about −20 degrees Celsius, of at or below about −20 degrees Celsius, of at or below about −40 degrees Celsius, at or below about −80 degrees Celsius, or at or below about −196 degrees Celsius.

When solution 122 and nerve graft 110 are frozen for sterilization, the conditions under which solution 122 and nerve graft 110 are frozen may be controlled. For example, the controlled freezing rate may be set below about 5 degrees Celsius per minute, below about 2 degrees Celsius per minute, for example at about 1 degree Celsius per minute or another rate, as desired, in order to prevent rapid temperature reductions and prevent or inhibit the formation of ice crystals.

Sterilization may be performed by one or more appropriate methods. In one example, nerve graft 110 may be subjected to gamma irradiation 132, as shown in FIG. 1, in an amount sufficient to sterilize nerve graft 110. In some examples, nerve graft 110 may be subjected to a gamma irradiation dose of about 0.5 kGy to about 100 kGy, about 1 kGy to about 50 kGy, or about 5 kGy to about 30 kGy. The gamma irradiation dose may be at least about 10 kGy, at least about 15 kGy, at least about 20 kGy, at least about 25 kGy, or at least about 30 kGy. As nerve graft 110 may be in the presence of solution 122 during sterilization, solution 122 may also be sterilized via gamma irradiation 132.

Following sterilization, solution 122 and nerve graft 110 may be stored together for a period of time, after which nerve graft 110 may be separated from solution 122 for use with a subject. In some examples, nerve graft 110 may be stored in solution 122 for a period of at least one day, at least one week, at least two weeks, at least one month, at least six weeks, at least two months, at least three months, at least six months, or at least one year. In particular, nerve graft 110 may be stored in solution 122 for about 24 hours, about two days, about four days, about one week, about two weeks, about four weeks, about six weeks, about eight weeks, about three months, about six months, about one year, about two years, about three years, about five years, or longer. During this period of time, solution 122 and nerve graft 110 may be stored at room temperature or at a temperature below room temperature. Solution 122 may be stored at a temperature of about 0 degrees Celsius to about 30 degrees Celsius, of about 12 degrees Celsius to about 28 degrees Celsius, or about 18 degrees Celsius to about 27 degrees Celsius. In some aspects, solution 122 may be stored at refrigeration temperature, at a temperature of about 4 degrees Celsius to about 20 degrees Celsius, or at a temperature of about 8 degrees Celsius to about 10 degrees Celsius. When solution 122 and nerve graft 110 are stored at a temperature below room temperature, this temperature may be less than about 18 degrees Celsius or less than about 12 degrees Celsius. In at least some configurations, solution 122 and the container or packaging in which solution 122 is stored, may enable visual confirmation that solution 122 is clear, i.e., free or generally free of contamination.

Figure 3:
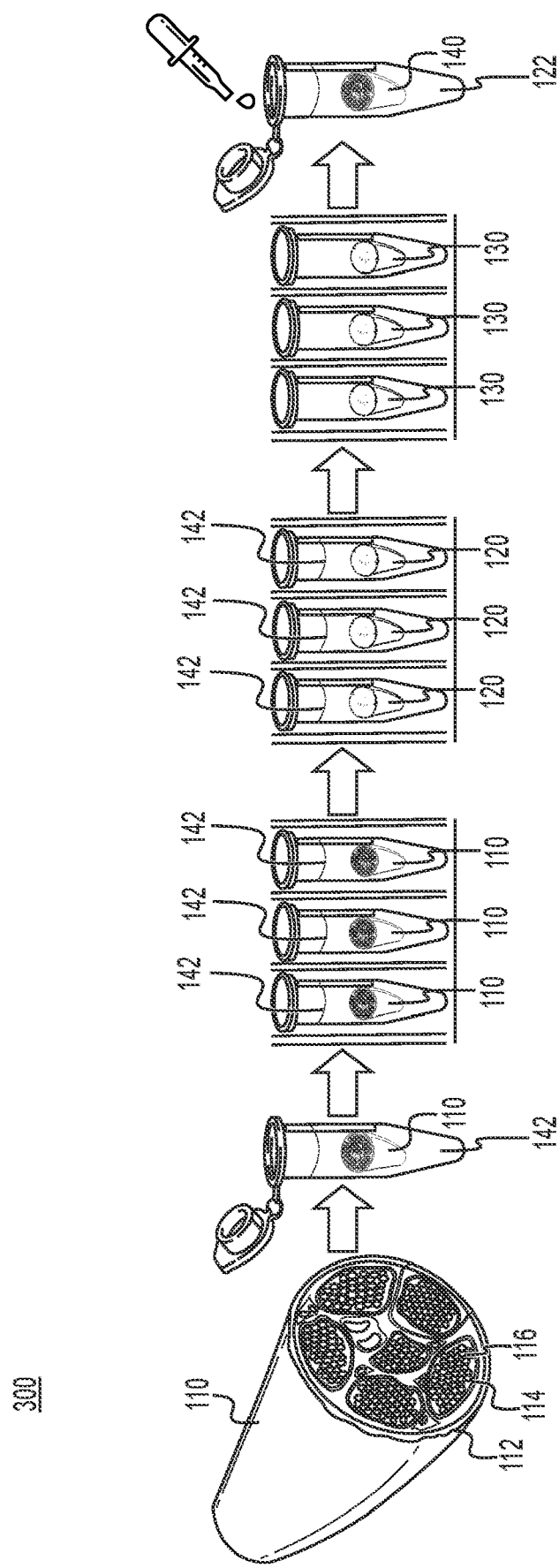
FIG. 3 shows a schematic diagram of another exemplary process for storing tissue or an implant, according to aspects of the present disclosure.

FIG. 3 illustrates an exemplary process 300 for preserving and/or rehydrating tissue, according to one or more aspects of the present disclosure. Process 300 may include obtaining a nerve graft 110, as described above with respect to step 202 of process 200 and the corresponding aspects of process 100. Nerve graft 110 may then be submerged in a lyophilization solution 142. Lyophilization solution 142 may be suitable for lyophilization of nerve graft 110 and may have one or more constituents that reduce or prevent damage to nerve graft 110 during the freeze-drying process.

Once nerve graft 110 is in the presence of lyophilization solution 142, and if desired, following an incubation period, solution 142 and nerve graft 110 may be exposed to freezing temperatures, producing frozen nerve graft 120. The temperature of nerve graft 110 and solution 142 may be reduced at a desired cooling rate to a temperature (e.g., a temperature of about 0 degrees Celsius to about −80 degrees Celsius) until nerve graft 110 freezes to form frozen nerve graft 120. Following freezing, solution 142 may be sublimated, resulting in a dehydrated, or lyophilized, nerve graft 130. Nerve graft 130 may be stored for a desired period of time (e.g., 24 hours, two days, four days, one week, two weeks, four weeks, six weeks, eight weeks, three months, six months, one year, two years, three years, five years, or longer).

Following storage of lyophilized nerve graft 130, nerve graft 130 may be rehydrated by being submerged in solution 122. Solution 122, as described with respect to process 300, may include the same constituents as described above with respect to process 100 and process 200. In particular, solution 122 may include one or more antimicrobial agents, such as chlorhexidine gluconate, and one or more stabilizing agents, such as propylene glycol. As described above, solution 122 may include LRS, PBS, physiological saline, and/or deionized water.

In some aspects, nerve graft 130 may be rehydrated using a rehydration solution that is different than solution 122. This rehydration solution may include one or more of deionized water, saline, LRS, or PBS. Nerve graft 130 may be immersed in this rehydration solution for a suitable period of time. Once nerve graft 130 is adequately rehydrated, the rehydration solution may be removed and replaced with solution 122 for preserving the rehydrated nerve graft 140 and preserving nerve graft 140. Such a rehydrated nerve graft 140 may be suitable for demonstration purposes, scientific experimentation, or implantation into a human or non-human subject.

Nerve graft 110, described above with respect to process 100 and process 200, and nerve graft 140, described above with respect to process 300, may be used in methods for treating a human or non-human animal subject. These methods may include implantation of nerve graft 110 or 140 to an injury site. A method of using nerve graft 110 or 140, whether stored at room temperature or in a lyophilized form, may include preparing a damaged nerve for implantation of nerve graft 110 or 140. Preparation may include exposing an injured nerve, preparing a nerve bed, and debriding and cleaning the damaged nerve to form a proximal nerve end and a distal nerve end. A nerve graft 110 or 140 having a desired diameter and/or length may be selected from a plurality of nerve grafts 110 or 140 having different diameters and/or lengths. A nerve graft 110 or 140 having a suitable length may be determined based on the distance between proximal and distal nerve ends, and may be approximately equal to this distance. Similarly, the diameter of nerve graft 110 or 140 may be selected based on the diameters of the proximal and distal nerve ends. The selected nerve graft 110 or 140 may then be removed from a storage system or container (e.g., packaging). This storage system or container may correspond to the above-described storage systems for storage of nerve graft 110 and may include solution 122. If desired, the nerve graft 110 or 140 may be rinsed in sterile saline or water for implantation after being removed from the storage system or container. If the case of nerve graft 140, which has been lyophilized, nerve graft 140 may be rehydrated and submerged in solution 122, either as part of rehydration or subsequent to rehydration. If nerve graft 110 or 140 is longer than the distance between the proximal and distal nerve ends, nerve graft 140 may be trimmed to a length that is approximately equal to this distance.

Implantation of nerve graft 110 or 140 may be performed by suturing nerve graft 110 or 140 to a proximal nerve end and a distal nerve end to bridge the gap between these nerve ends, resulting in an implanted nerve graft 140. The surgical site with the implanted nerve graft 110 or 140 may be sutured closed. The implanted nerve graft 110 or 140 may facilitate recovery of the subject's tissue. In particular, nerve graft 110 or 140, after implantation, may provide structural support that enables axonal regeneration and healing of the injured nerve tissue.

EXAMPLES

The disclosure may be further understood by the following non-limiting examples. The examples are intended to illustrate embodiments of the above disclosure, and should not be construed as to narrow its scope. One skilled in the art will readily recognize that the examples suggest many other ways in which the embodiments of the disclosure could be practiced. It should be understood that numerous variations and modifications may be made while remaining within the scope of the disclosure.

Example 1

Nerve grafts were prepared by decellularizing nerve tissue and dividing the nerve tissue into two storage conditions. The decellularized nerve grafts were prepared for storage at room temperature. Nerve grafts were also prepared for storage while remaining in a frozen state for comparison with the nerve grafts stored at room temperature. After storage, these nerve grafts were observed to exhibit microstructure and observed to exhibit suture pull out strength similar to currently marketed nerve grafts. Accordingly, the microstructure and suture pull out strength were consistent with suitability for supporting peripheral nerve regeneration in a human or non-human subject.

The nerve grafts were further divided into two groups. The first group of nerve grafts included four nerve grafts, two nerve grafts having a diameter of greater than 3 mm, and two nerve grafts having a diameter less than 3 mm, which were submerged in a preservative solution and stored at room temperature. A second group of nerve grafts included four nerve grafts, two nerve grafts having a diameter of greater than 3 mm, and two nerve grafts having a diameter less than 3 mm, which were placed in a small amount of LRS and stored in a frozen condition.

The nerve grafts of the first group, for storage at room temperature, were submerged in a diluted preservative solution. This diluted preservation solution was formed by mixing 5.2 mL of a concentrated solution containing chlorhexidine gluconate and propylene glycol with 1000 mL of LRS as a diluent. The diluted solution included 0.005% chlorhexidine gluconate by weight, and 0.05% propylene glycol by weight. Each nerve graft of the first group together with the diluted solution, was frozen at −80 degrees Celsius. The frozen nerve grafts and solution were then sterilized via gamma irradiation. The gamma-irradiated nerve grafts were thawed and allowed to warm to room temperature. These nerve grafts were incubated, at room temperature, for a period of two weeks while being protected from light. The nerve grafts belonging to the second group remained frozen after gamma irradiation. The frozen nerve grafts were stored in the frozen condition for the same two-week period of time, while being protected from light. Once the two-week incubation was completed, the frozen nerve grafts were thawed, allowed to warm to room temperature, and evaluated as described below.

The evaluation of each nerve graft included comparing each individual nerve graft to a plurality of acceptance criteria to determine whether the nerve graft would be suitable for use as an implant following preservation and storage. In particular, each individual nerve graft from the two groups was visually inspected, including the nerve graft itself and the storage solution. Each sample was handled to determine stiffness. Each nerve graft was evaluated via anti-laminin immunohistochemistry to observe and evaluate endoneurial tube structure (results shown in FIGS. 4A-4D and 5B), and tested to determine suture pull-out strength (results shown in FIG. 5A). The frozen nerve grafts from the second group were thawed prior to these evaluations.

During the visual inspection of the solution for the room temperature-stored nerve grafts, it was observed that each solution was clear and free of visible contamination. The room temperature-stored nerve grafts were not visually inferior to the frozen nerve grafts. During physical handling, the room temperature-stored nerve grafts were somewhat stiffer than the nerve grafts stored in a frozen condition, but retained suitable flexibility.

Results of the histological evaluations are summarized in FIGS. 4A-4D. Each of FIGS. 4A-4D illustrates a laminin-stained section of a nerve graft, in which endoneurial tube basement membranes containing Laminin protein are identified by dark brown stain deposition (darker areas in FIGS.

Figure 4A:
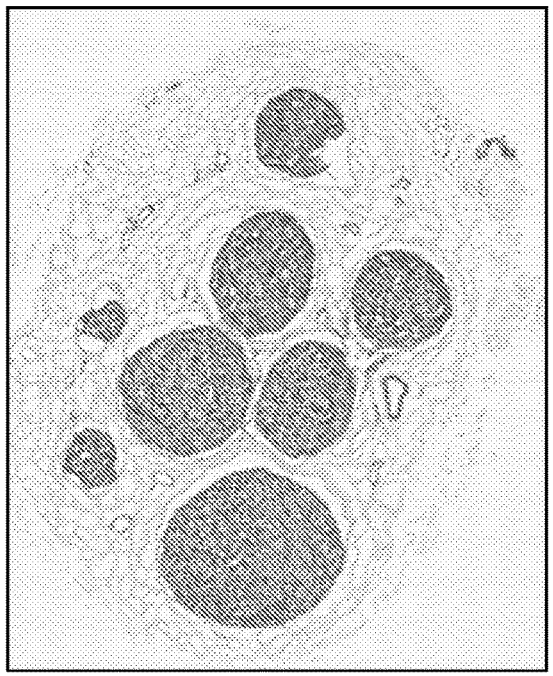
FIG. 4A shows a histological section of nerve tissue stored in a solution, according to aspects of the present disclosure.
Figure 4B:
FIG. 4B shows a histological section of nerve tissue stored while frozen, according to aspects of the present disclosure.
Figure 4C:
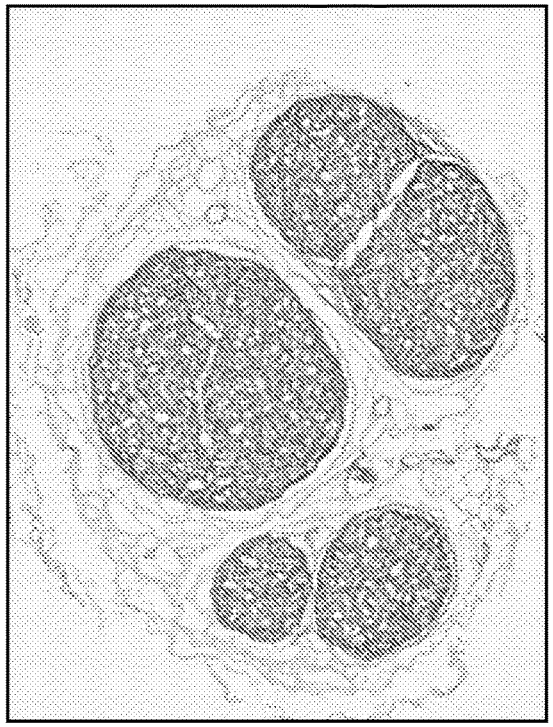
FIG. 4C shows a histological section of nerve tissue stored in a solution, according to aspects of the present disclosure.
Figure 4D:
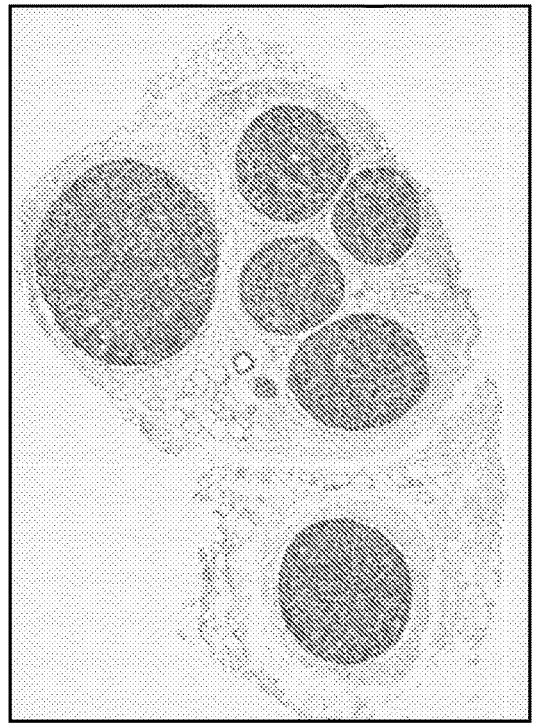
FIG. 4D shows a histological section of nerve tissue stored while frozen, according to aspects of the present disclosure.

4A-4D) inside of the fascicles of the nerve tissue. FIG. 4A illustrates a nerve graft stored at room temperature, the nerve graft having a diameter greater than 3 mm. In FIG. 4A, each of the substantially circular portions illustrates a preserved endoneurial tube structure inside of the fascicle. FIG. 4B illustrates a nerve graft having a diameter greater than 3 mm that was stored in a frozen condition. FIGS. 4C and 4D illustrate nerve grafts stored at room temperature and nerve grafts stored in a frozen condition, respectively. The nerve grafts illustrated in FIGS. 4C and 4D each had a diameter of less than 3 mm. As can be seen in FIGS. 4A and 4C, some tissue separation was observed in the fascicles. Some nerve graft samples stored at room temperature exhibited minor changes in endoneurial tube size and shape. However, the room temperature-stored nerve grafts contained substantially intact endoneurial tubes in the fascicles. The endoneurial tubes were observed to have experienced relatively limited structural changes and had a morphology consistent with sufficient preservation. The preservation of the endoneurial tubes in the room-temperature stored nerve grafts was comparable to that of the nerve grafts stored while frozen.

Figure 5A:
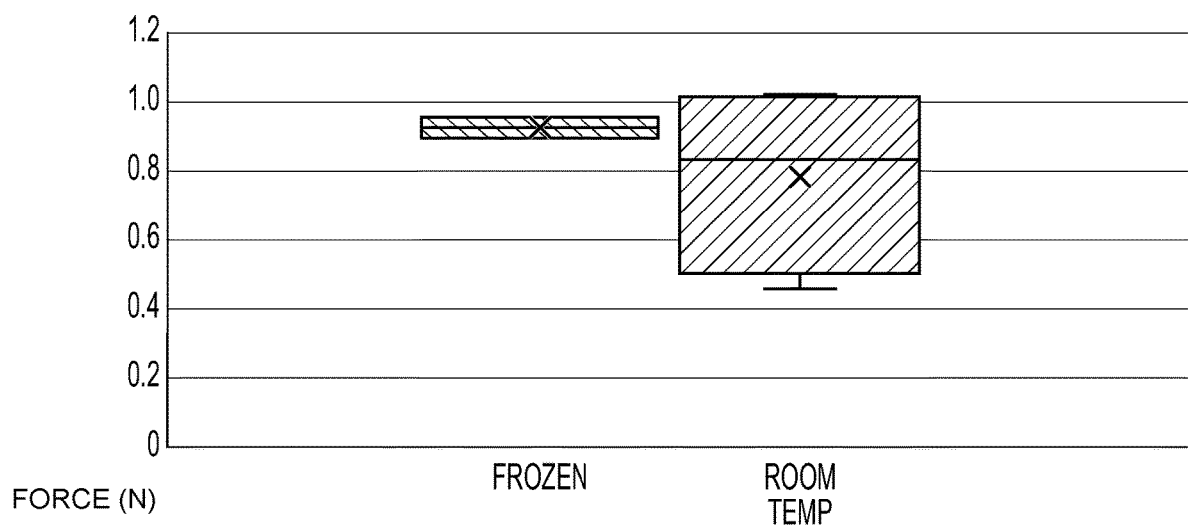
FIG. 5A shows a chart illustrating suture retention characteristics of nerve tissue stored under different conditions, according to aspects of the present disclosure.
Figure 5B:
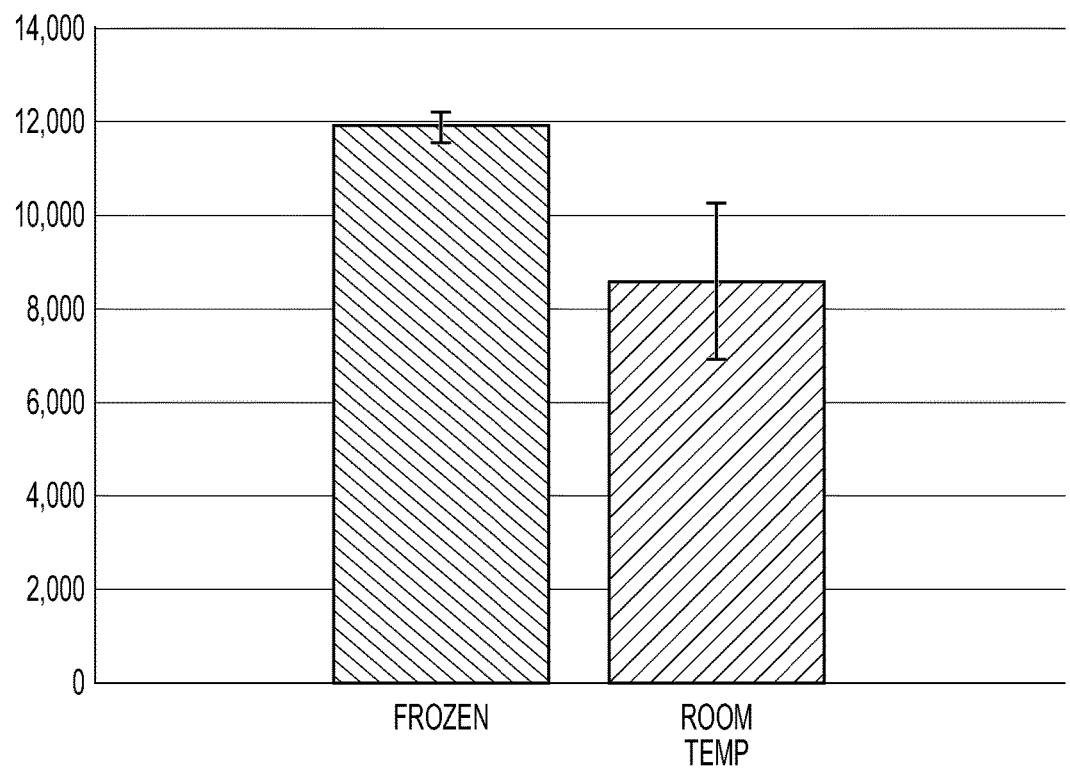
FIG. 5B shows a chart illustrating an assessment of endoneurial tubes present in nerve tissue after being stored in different conditions, according to aspects of the present disclosure.

FIGS. 5A and 5B illustrate exemplary quantitative analyses of the nerve tissues that were stored as described above. FIG. 5A shows the results of suture pull-out tests as a bar chart in which each bar representing the range of measured values for the maximum force that was needed to separate a suture, with the smallest maximum pull-out force represented by the bottom of each bar and a largest maximum pull-out force represented by the top of each bar. The error bars in FIG. 5A illustrate the standard deviation, the "X" illustrates the mean value, and the horizontal line within each bar illustrates the median value of these tests.

The suture pull-out assessment, the results of which are shown in FIG. 5A, was performed with a 9-0 suture, suitable for implantation of this type of nerve graft, that was inserted through the epineurium about 5 mm from the edge of each nerve graft, and a loop was formed for attachment of the suture to a mechanical testing device. A constant pull force of 1 mm per second was applied until suture or tissue failure. The maximum force applied indicates the relative strength of the preserved tissue beyond the strength of the sutures that may be used for implantation. As can be seen in FIG. 5A, the room temperature-stored nerve grafts had suitable maximum pullout forces, forces in excess of the strength of suture material, of greater than about 0.5 N (Newtons) and less than about 1.2 N, as compared to nerve grafts stored while frozen, which exhibited maximum pullout forces of about 0.95 N. While the room temperature-stored tissue had a somewhat higher variability in the values measured, the measured values were suitable for implantable tissue. While not wishing to be bound by theory, this variability may be due to the relatively higher stiffness of the samples having a diameter less than 3 mm and/or suturing variability. In all measured samples, suture failure was observed before the tissue failure, which indicates acceptable tissue preservation.

FIG. 5B illustrates the result of endoneurial tube assessments that were performed on the nerve graft of each group. The endoneurial tube assessment (ETA) reflected in FIG. 5B includes a quantitative measure of the endoneurial tube perimeter per 100,000 $\mu m^2$ of the fascicular area. The laminin-stained surfaces identify endoneurial tube basement membranes, higher scores being assigned to nerve grafts containing larger perimeters of the endoneurial tubes that fit into a defined range of size and circularity. The bars in FIG. 5B include a first bar having a height that represents the average ETA score for the nerve grafts stored in a frozen state and a second bar that has a height that represents the average ETA score for the nerve grafts that were stored at room temperature. Nerve grafts that were stored in a frozen condition had somewhat higher ETA scores as compared to the room temperature-stored nerve graft samples. As shown in FIG. 5B, the average ETA score for nerve grafts stored in a frozen condition was about 12,000, while the ETA score for the room temperature-stored nerve grafts was about 8,200. The ETA scores for the room temperature-stored nerve grafts, while smaller than the nerve tissue stored while frozen, remained within an acceptable range. In some aspects, these ETA scores were consistent with nerve grafts that, after storage at room temperature, are able to satisfy acceptance criteria for implantation in a human or non-human subject and thus indicated appropriate preservation of the room temperature-stored nerve grafts.

Example 2

Nerve grafts were prepared by decellularizing nerve tissue. Each decellularized nerve was split between four groups, as described below. The decellularized nerve grafts were prepared for storage at room temperature. Decellularized nerve grafts were also prepared for storage in a frozen state, these nerve grafts being suitable for implantation in a human or non-human subject. A first group of nerve grafts in Example 2 included 12 nerve grafts, 6 nerve grafts having a diameter of greater than 3 mm, and 6 nerve grafts having a diameter less than 3 mm. All nerve grafts of the first group were submerged in a preservative solution and stored at room temperature for 4 weeks. A second group of nerve grafts included 12 nerve grafts, 6 nerve grafts having a diameter of greater than 3 mm, and 6 nerve grafts having a diameter less than 3 mm, that were placed in LRS and stored in a frozen condition for 4 weeks. The third group included 12 nerve grafts, 6 nerve grafts having a diameter of greater than 3 mm, and 6 nerve grafts having a diameter less than 3 mm, that were submerged in a preservative solution and stored at room temperature for 12 weeks. A fourth group of nerve grafts included 12 nerve grafts, 6 nerve grafts having a diameter of greater than 3 mm, and 6 nerve grafts having a diameter less than 3 mm, that were placed in LRS and stored in a frozen condition for 12 weeks.

The nerve grafts of the first and third groups, which were stored at room temperature, were introduced to a diluted preservative solution prior to storage. This diluted solution was formed by mixing 3.13 mL of a concentrated solution containing chlorhexidine gluconate and propylene glycol with 1000 mL of LRS. The diluted solution included 0.003% chlorhexidine gluconate by weight, and 0.03% propylene glycol by weight. Each nerve graft of the first group, including the diluted solution, was then frozen and sterilized via gamma irradiation, as described above with respect to Example 1. The gamma-irradiated nerve grafts were then thawed and allowed to warm to room temperature. The room-temperature nerve grafts of the first and third groups were incubated, at room temperature, for a period of 4 weeks or 12 weeks, respectively, while being protected from light. The nerve grafts belonging to the second group and the fourth group were stored while frozen and protected from light for 4 weeks or 12 weeks, respectively.

Each nerve graft was evaluated and compared to acceptance criteria described above with respect to Example 1. During the visual inspection of the solution of the room temperature-stored nerve grafts, it was observed that each solution was clear and free of visible contamination. The room temperature-stored nerve grafts were not visually inferior to the frozen nerve grafts, and, while observed during handling to be stiffer than the nerve grafts stored in a frozen condition, exhibited suitable flexibility.

Figure 6A:
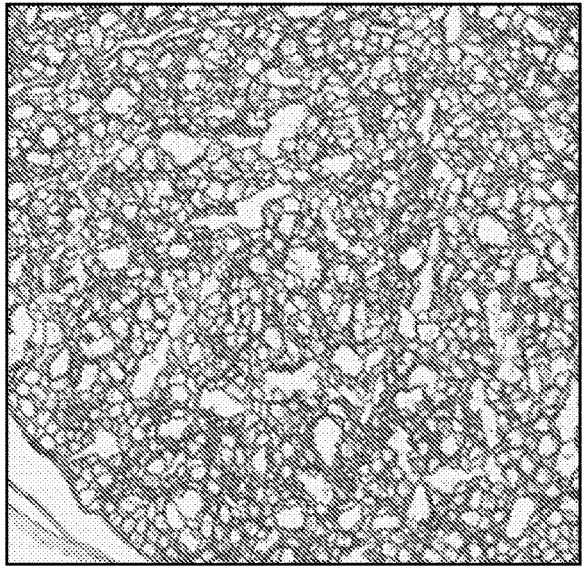
FIG. 6A shows a histological section of nerve tissue stored in a solution, according to aspects of the present disclosure
Figure 6B:
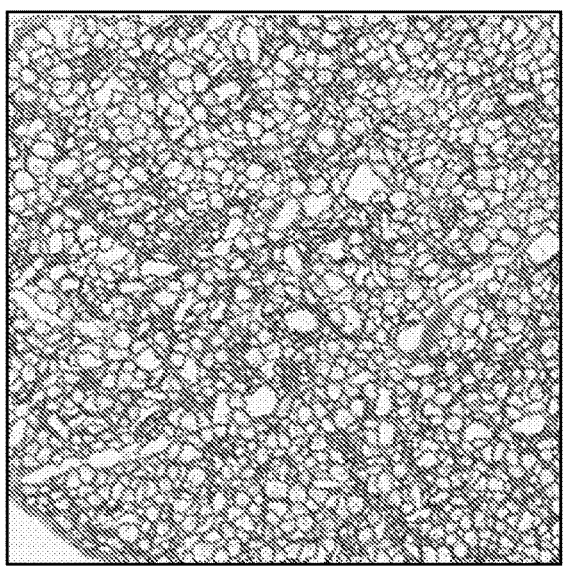
FIG. 6B shows a histological section of nerve tissue stored while frozen, according to aspects of the present disclosure.
Figure 6C:
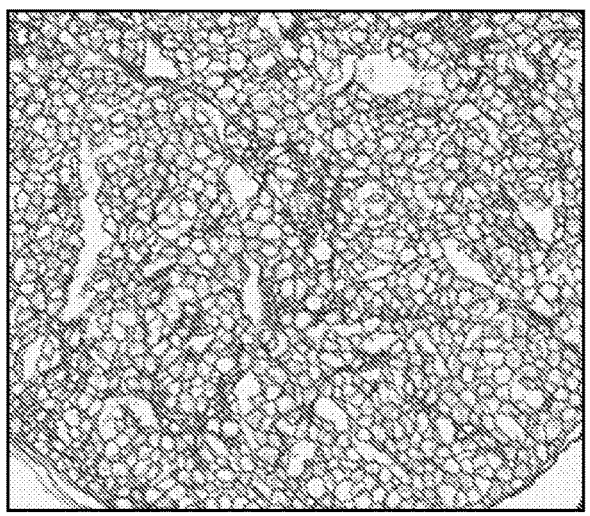
FIG. 6C shows a histological section of nerve tissue stored in a solution, according to aspects of the present disclosure
Figure 6D:
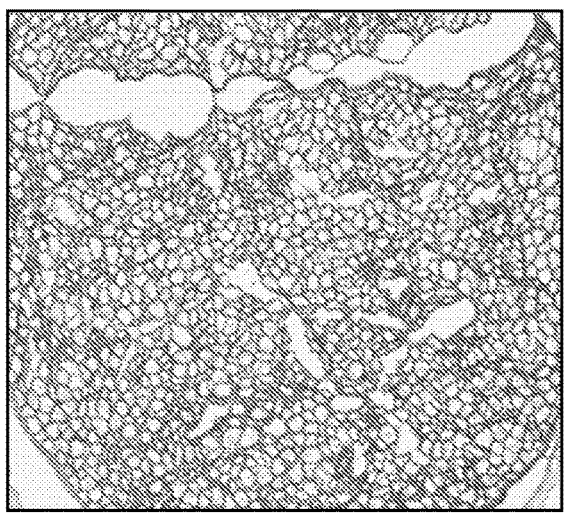
FIG. 6D shows a histological section of nerve tissue stored while frozen, according to aspects of the present disclosure.

Exemplary results of the histological evaluations for each of the four groups are shown in FIGS. 6A-6D. Each of FIGS. 6A-6D illustrates a laminin-stained section of a nerve graft, having an enlarged (FIGS. 6A-6D having increased magnification to facilitate observation of nerve graft structure) view as compared to FIGS. 4A-4D. FIG. 6A illustrates a nerve graft of the first group, stored at room temperature for 4 weeks. FIG. 6B illustrates a nerve graft of the second group that was stored in a frozen condition for four weeks. FIGS. 6C and 6D illustrate nerve grafts stored at room temperature (third group) and nerve grafts stored in a frozen condition (fourth group), respectively. The nerve grafts illustrated in FIGS. 6C and 6D were each stored for 12 weeks. As can be seen in FIGS. 6A and 6C, the room temperature-stored nerve grafts contained intact endoneurial tubes that were comparable in structure to the nerve grafts that were stored in a frozen state. Each individual endoneurial tube experienced relatively minimal structural changes and sufficient preservation, as compared to the nerve grafts of FIGS. 6B and 6D, which were stored while frozen.

Figure 7A:
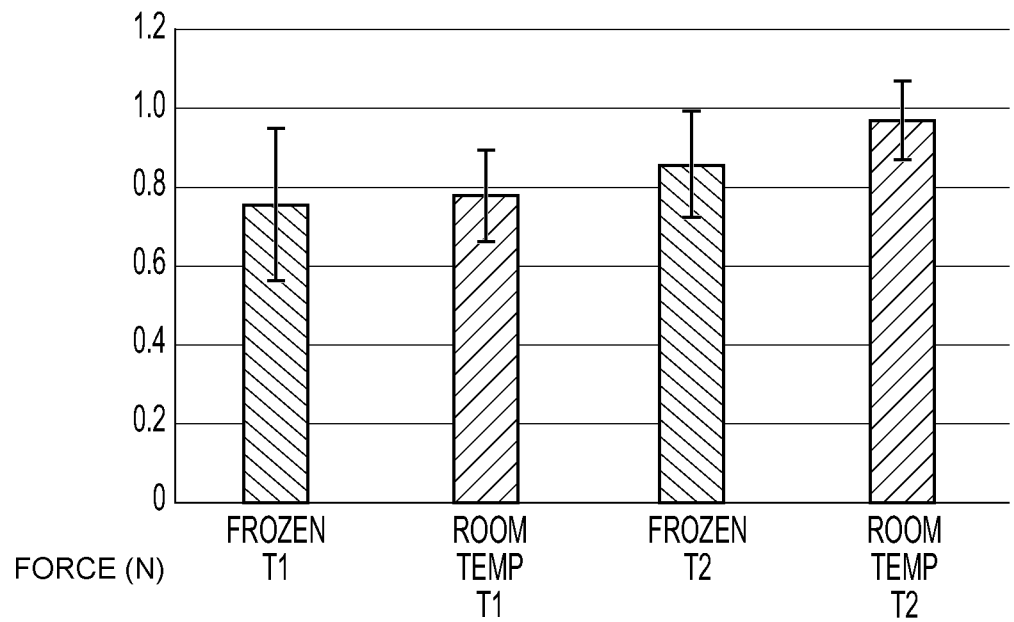
FIG. 7A shows a chart illustrating suture retention characteristics of nerve tissue stored under different conditions, according to aspects of the present disclosure.
Figure 7B:
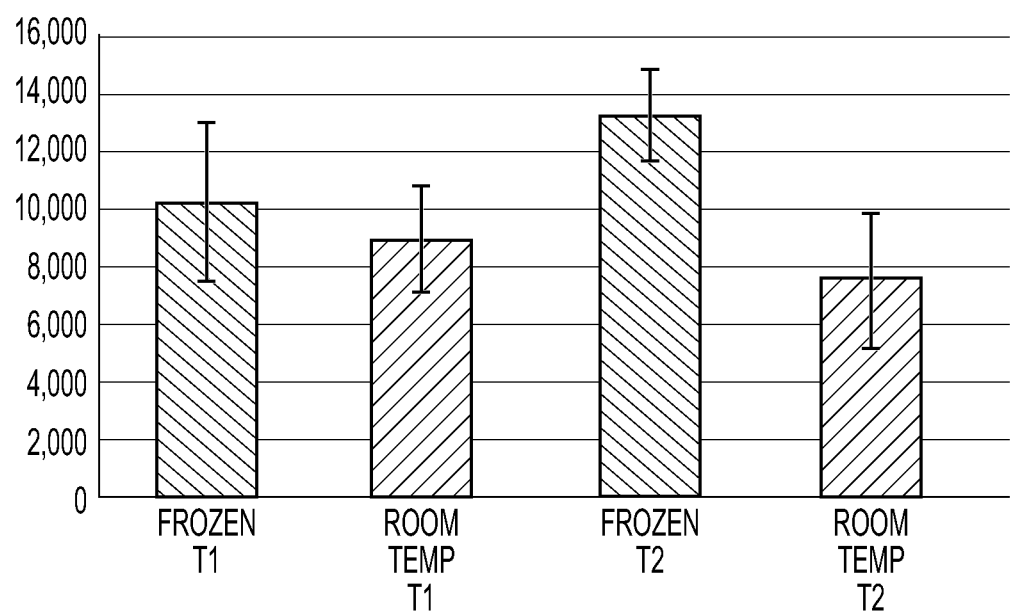
FIG. 7B shows a chart illustrating an assessment of endoneurial tubes present in nerve tissue after being stored in different conditions, according to aspects of the present disclosure.

FIGS. 7A and 7B illustrate exemplary quantitative analyses of the nerve tissues that were stored as described above. FIG. 7A shows the results of suture pull-out tests as a bar chart in which the height of each bar illustrates the mean pull out force, in Newtons, that was measured for each group. The error bars in FIG. 7A illustrate the standard deviation of these measurements. In FIG. 7A, "Frozen T1" refers to the group of nerve grafts that were frozen and stored for 4 weeks, "Room Temp T1" refers to the group of nerve grafts that were stored at room temperature for 4 weeks, "Frozen T2" refers to the group of nerve grafts that were frozen and stored for 12 weeks, "Room Temp T2" refers to the group of nerve grafts that were stored at room temperature for 12 weeks.

As can be seen in FIG. 7A, the room temperature-stored nerve grafts performed similarly to the corresponding groups of nerve grafts that were stored while frozen. The frozen and room temperature-stored nerve grafts stored for 4 weeks exhibited an average suture pull-out force of between about 0.7 N and about 0.8 N. The nerve grafts stored in a frozen condition for 12 weeks exhibited an average suture pull-out force of between about 0.8 N and about 0.9 N, while the nerve grafts stored in at room temperature showed an average suture pull-out force of between about 0.9 N and about 1.0 N. All tests resulted in suture failure prior to failure of the nerve graft, including the tests for each nerve graft stored at room temperature, indicating satisfactory preservation. Additionally, variability across these measurements was acceptable for the group of nerve grafts stored for 4 weeks, and the group of nerve grafts that were stored for 12 weeks.

FIG. 7B illustrates the result of endoneurial tube assessments (ETAs) that were performed on each nerve graft to evaluate endoneurial tube perimeter, as described above, with higher scores indicating larger perimeter of endoneurial tubes. The bars in FIG. 7B include a first bar ("Frozen T1") having a height that represents the average ETA score for the nerve grafts stored in a frozen state for 4 weeks. This ETA score was about 10,000. A second bar ("Room Temp T1") in FIG. 7B has a height that represents the average ETA score for nerve grafts that were stored at room temperature for 4 weeks, about 9,000. FIG. 7B further includes a third bar ("Frozen T2") having a height that represents the average ETA score for the nerve grafts stored in a frozen state for 12 weeks, about 13,000, and a fourth bar ("Room Temp T2") having a height that represents the average ETA score for nerve grafts that were stored at room temperature for 12 weeks, about 7,500. Nerve grafts that were stored at room temperature exhibited comparable ETA scores to nerve graft samples stored in a frozen condition for the same period of time. The ETA scores for the room temperature-stored nerve grafts remained within a suitable range for the group of nerve grafts stored for 4 weeks, and for the group of nerve grafts stored for 12 weeks. Specifically, ETA scores for the room temperature-stored nerve grafts, whether stored for 4 weeks or 12 weeks, remained within an acceptable range. In some aspects, these ETA scores were consistent with nerve grafts that, after storage at room temperature, are able to satisfy acceptance criteria for implantation in a human or non-human subject and thus indicated appropriate preservation of the room temperature-stored nerve grafts.

Example 3A

Nerve grafts were prepared by decellularizing nerve tissue and dividing the nerve tissue into two groups with different storage conditions. The decellularized nerve grafts for the first group were prepared for storage at a refrigeration temperature of 4 degrees Celsius. Nerve grafts for the second group were prepared for storage while remaining in a frozen state for comparison with the nerve grafts stored at the refrigeration temperature. The first group of nerve grafts included ten nerve grafts, five nerve grafts having a diameter of greater than 3 mm, and five nerve grafts having a diameter less than 3 mm, which were each submerged in a preservative solution and stored at the refrigeration temperature of 4 degrees Celsius. The second group of nerve grafts included ten nerve grafts, five nerve grafts having a diameter of greater than 3 mm, and five nerve grafts having a diameter less than 3 mm, each of which were placed in a small amount of LRS and stored in a frozen condition at −80 degrees Celsius.

The decellularized nerve grafts were prepared for storage at 4 degrees Celsius by being placed in a diluted preservative solution. This diluted solution was formed by mixing 5.2 mL of a concentrated solution containing chlorhexidine gluconate and propylene glycol with 1000 mL of phosphate buffer saline (PBS) as a diluent. The PBS had a pH of 7.4. The diluted solution included 0.005% chlorhexidine gluconate by weight, and 0.05% propylene glycol by weight. The solution also contained dissolved magnesium chloride hexahydrate in an amount of 0.6% by weight.

Each nerve graft was then frozen and sterilized via gamma irradiation. The gamma-irradiated nerve grafts of the first group were then thawed in a refrigerated environment and allowed to warm to the refrigeration temperature of 4 degrees Celsius. The refrigeration-temperature nerve grafts were incubated, at 4 degrees Celsius, for a period of 12 weeks while being protected from light.

Each nerve graft was evaluated and compared to acceptance criteria described above with respect to Example 1. During the visual inspection of the solution of the refrigeration-temperature-stored nerve grafts, it was observed that each solution was clear and free of visible contamination. The refrigeration-temperature-stored nerve grafts were not visually inferior to the frozen nerve grafts, and contained only small amounts of sediment in some of the storage containers. Additionally, the refrigeration-temperature-stored nerve grafts exhibited similar mechanical integrity when compared to the frozen nerve grafts or to the samples from Example 1 and Example 2.

Figure 8A:
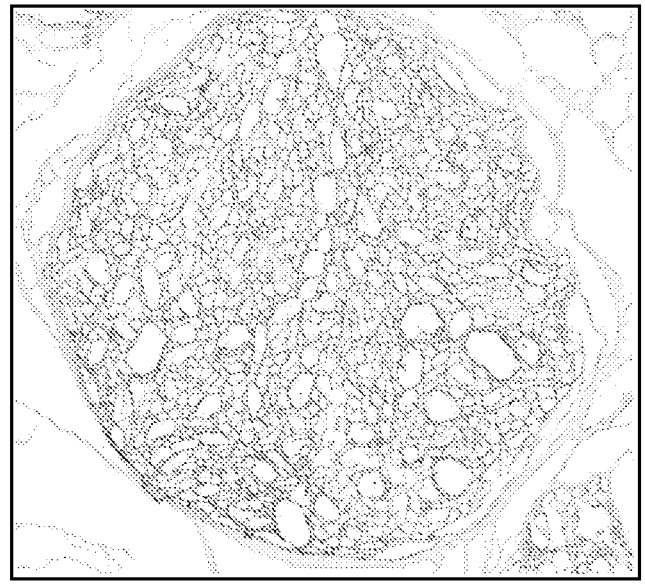
FIG. 8A shows a histological section of nerve tissue that was stored in a solution, according to aspects of the present disclosure.
Figure 8B:
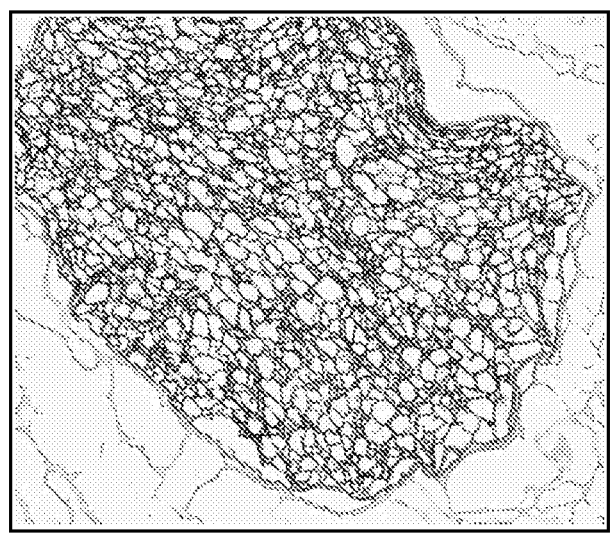
FIG. 8B shows a histological section of nerve tissue that was stored while frozen, according to aspects of the present disclosure.

Histology was also performed on the nerve grafts after the 12-week incubation period to assess endoneurial tube structure. Exemplary results of the histological evaluations for the refrigerated and frozen samples are shown in FIGS. 8A and 8B, respectively. FIG. 8A illustrates a laminin-stained section of a nerve graft that was stored in a refrigerated condition. FIG. 8B illustrates a laminin-stained section of a nerve graft that was stored in a frozen condition. FIGS. 8A and 8B each illustrate preserved endoneurial tube structure inside of a single fascicle. As can be seen in FIGS. 8A and 8B, laminin staining was somewhat reduced as compared to Examples 1 and 2, resulting in a somewhat lighter visual appearance for both the refrigerated and frozen samples. Both the refrigerated and frozen samples had acceptable appearances and substantially intact endoneurial tubes in the fascicles.

A quantitative analysis of the nerve tissues of Example 3 is provided as Table 1 below. Table 1 presents ETA scores for four exemplary samples of each group. Results for the first group are presented in the column labelled "Refrigerated," while results for the second group are presented in the column labelled "Frozen." Table 1 presents one ETA score for a sample having a diameter greater than 3 mm that was stored in a refrigerated condition, and one ETA score for a sample having a diameter greater than 3 mm that was stored in a frozen condition. Three additional ETA scores are included for exemplary samples having diameters of less than 3 mm that were stored in a refrigerated condition, as well as three ETA scores for samples having diameters less than 3 mm that were stored in a frozen condition.

As indicated in Table 1, the ETA scores for all refrigerated samples were acceptable, regardless of whether the diameter of the sample was greater than 3 mm or less than 3 mm. The scores for the first group were comparable to the scores for the samples stored in a frozen (−80 degree Celsius) condition. The average ETA score for the refrigerated samples was slightly smaller than the average ETA score for the frozen samples.

TABLE 1

|  | Frozen | Refrigerated |
| --- | --- | --- |
| Sample 1 (size > 3 mm) | 6,351.3 | 8,299.2 |
| Sample 2 (size < 3 mm) | 3,988.1 | 4,500.7 |
| Sample 3 (size < 3 mm) | 7,561.2 | 8,802.1 |
| Sample 4 (size < 3 mm) | 11,385.7 | 7,020.2 |
| Average | 7,321.6 | 7,155.6 |

The properties of the refrigeration-temperature-stored nerve grafts of Example 3A, represented at least in part by the above-identified evaluations, were consistent with nerve grafts that, after storage at room temperature, are consistent with suitability for supporting peripheral nerve regeneration in a human or non-human subject after preservation for 12 weeks, and thus indicated appropriate preservation of the refrigeration-temperature-stored nerve grafts.

Example 3B

Nerve grafts were prepared and stored as described above with respect to Example 3A. A first group of nerve grafts included eight nerve grafts prepared in this manner, the first group including four nerve grafts having a diameter of greater than 3 mm, and four nerve grafts having a diameter less than 3 mm, each of which was submerged in a preservative solution (described above with respect to Example 3A) and stored at the refrigeration temperature of 4 degrees Celsius. A second group of nerve grafts included eight nerve grafts, four nerve grafts having a diameter of greater than 3 mm, and four nerve grafts having a diameter less than 3 mm, that were each placed in a small amount of LRS and stored in a frozen condition at −80 degrees Celsius. All nerve grafts were sterilized and incubated at either refrigeration temperatures of 4 degrees Celsius, or at −80 degrees Celsius, for a period of two weeks.

Figure 9A:
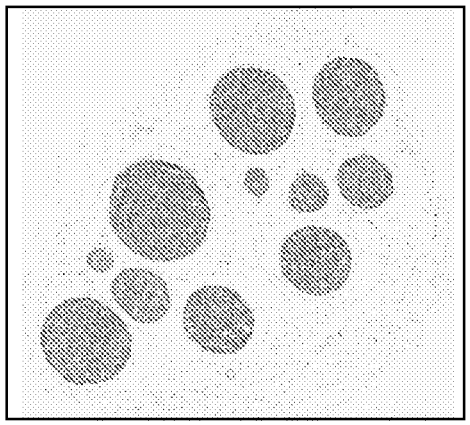
FIG. 9A shows a histological section of nerve tissue of nerve tissue that was stored in a solution, according to aspects of the present disclosure.
Figure 9B:
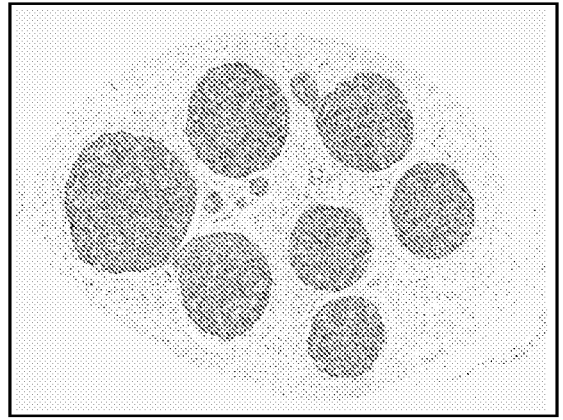
FIG. 9B shows a histological section of nerve tissue of nerve tissue that was stored while frozen, according to aspects of the present disclosure.
Figure 9C:
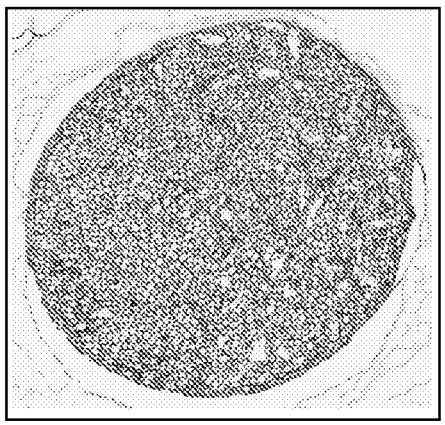
FIG. 9C shows a histological section of nerve tissue of nerve tissue that was stored in a solution, according to aspects of the present disclosure.
Figure 9D:
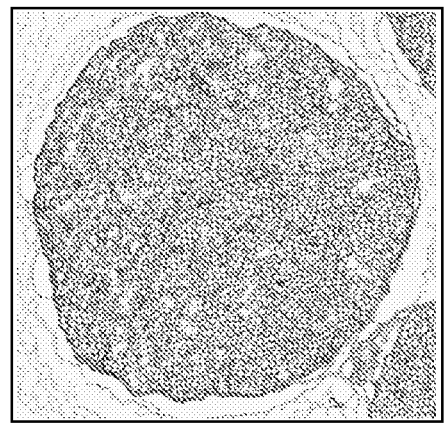
FIG. 9D shows a histological section of nerve tissue of nerve tissue that was stored while frozen, according to aspects of the present disclosure.

Following incubation, histology was performed to assess endoneurial tube structure. Exemplary results of the histological evaluations for the refrigerated and frozen samples are shown in FIGS. 9A-9F. FIG. 9A illustrates a laminin-stained section of a nerve graft that was stored in a refrigerated condition, the nerve graft having a diameter that is greater than 3 mm. FIG. 9B illustrates a laminin-stained section of a nerve graft that was stored in a frozen condition, the nerve graft having a diameter greater than 3 mm. FIG. 9C is an enlarged image of a nerve graft stored at refrigerated temperature, and FIG. 9D is an enlarged image of a nerve graft that was stored while frozen.

As can be seen in FIGS. 9A-9D, the nerve graft samples stored at refrigeration temperatures (FIGS. 9A and 9C) presented substantially intact endoneurial tube structure. The nerve graft samples stored at refrigeration temperatures exhibited slightly looser perineurial ECM, slightly increased fascicular separation, and some non-specific staining in the endoneurial tubes as compared to samples that were stored in the frozen condition. Despite this, endoneurial tubes of the refrigerated samples were observed to have experienced relatively limited structural changes and a morphology (e.g., microstructure) consistent with sufficient preservation. Overall, the preservation of the endoneurial tubes in the refrigeration-temperature stored nerve grafts was visually comparable to that of the nerve grafts stored while frozen.

Endoneurial tube assessments (ETA) were also performed on the refrigerated and frozen samples having diameters greater than 3 mm. The samples stored in a refrigerated condition exhibited an average ETA score of 9,359.60 (with a standard deviation of 2,306.95), as compared to an average ETA score of 14,493.04 (with a standard deviation of 1,670.25). The ETA scores of the refrigerated samples were consistent with nerve tissue that, after storage, are able to satisfy acceptance criteria for implantation in a human or non-human subject.

Figure 9E:
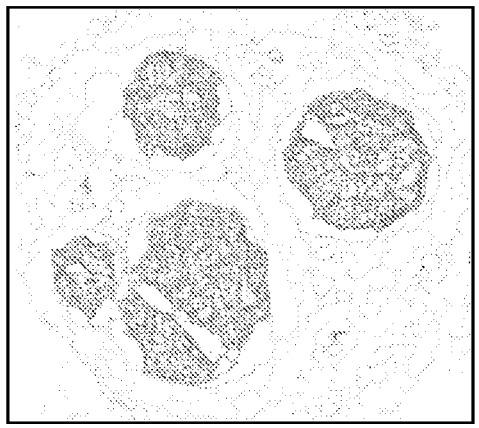
FIG. 9E shows a histological section of nerve tissue of nerve tissue that was stored in a solution, according to aspects of the present disclosure.
Figure 9F:
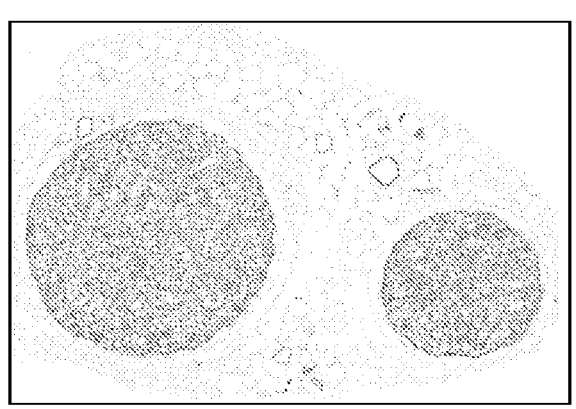
FIG. 9F shows a histological section of nerve tissue of nerve tissue that was stored while frozen, according to aspects of the present disclosure.

FIGS. 9E and 9F illustrate laminin-stained sections of nerve grafts that were stored at refrigeration temperatures (FIG. 9E) and at −80 degrees Celsius (FIG. 9F). The nerve grafts illustrated in FIGS. 9E and 9F each had a diameter of less than 3 mm. As can be seen by comparing FIGS. 9E and 9F, the refrigeration-temperature-stored nerve grafts experienced minor separation of fascicular tissue from the surrounding tissue. Additionally, as shown in FIG. 9E, some endoneurial tube damage occurred, and some shrinkage was observed. These alterations in morphology were limited to samples having a diameter of less than 3 mm and were relatively minor in nature. The nerve grafts stored at 4 degrees Celsius were observed to exhibit microstructure consistent with suitability for supporting peripheral nerve regeneration in a human or non-human subject after preservation, and thus indicated appropriate preservation of the refrigeration-temperature-stored nerve grafts.

It should be understood that although the present disclosure has been made with reference to preferred embodiments, exemplary embodiments, and optional features, modifications and variations of the concepts herein disclosed may be resorted to by those skilled in the art, and that such modifications and variations are considered to be within the scope of this disclosure as defined by the appended claims. The specific embodiments and examples provided herein are examples of useful embodiments of the present disclosure and are non-limiting and illustrative only. It will be apparent to one skilled in the art that the present disclosure may be carried out using a large number of variations of the devices, device components, methods, and steps set forth in the present description. As will be recognized by one of skill in the art, methods and devices useful for the present methods can include a large number of various optional compositions and processing elements and steps.

What is claimed is:

1. A method for preserving a tissue graft, the method comprising:
submerging the tissue graft in a solution containing one or more antimicrobial agents and one or more stabilizing agents; and
storing the tissue graft in the solution for a period of time of at least 24 hours while the solution is in an unfrozen state, the solution comprising chlorhexidine gluconate and propylene glycol, the chlorhexidine gluconate being included in the one or more antimicrobial agents and the propylene glycol being included in the one or more stabilizing agents, an amount of the propylene glycol in the solution being greater than an amount of the chlorhexidine gluconate in the solution, the amounts being measured by weight.

2. The method of claim 1, wherein the tissue graft is a nerve graft.

3. A method of preserving a tissue graft, the method comprising:
submerging the tissue graft in a solution containing one or more antimicrobial agents; and
storing the tissue graft in the solution for a period of time of at least 24 hours while the solution is in an unfrozen state, chlorhexidine gluconate being present in the solution in an amount of about 0.0005% by weight to about 2% by weight, the chlorhexidine gluconate being included as the one or more antimicrobial agents.

4. The method of claim 3, wherein the solution contains one or more stabilizing agents, the one or more stabilizing agents comprising propylene glycol.

5. The method of claim 1, wherein the propylene glycol is present in the solution in an amount of about 0.001% by weight to about 50% by weight.

6. The method of claim 1, wherein the solution further comprises one or more of lactated ringer's solution (LRS), phosphate buffer saline (PBS), physiological saline, or deionized water.

7. The method of claim 1, wherein the solution is free of dimethyl sulfoxide.

8. The method of claim 1, wherein the solution is substantially free of dimethyl sulfoxide.

9. The method of claim 1, wherein the solution further comprises one or more of glycerol or dimethyl sulfoxide.

10. The method of claim 1, wherein the tissue graft is stored at a temperature of about 0 degrees Celsius to about 30 degrees Celsius.

11. The method of claim 1, wherein the tissue graft is stored at room temperature.

12. The method of claim 1, further comprising sterilizing the tissue graft prior to storing the tissue graft.

13. The method of claim 12, wherein sterilizing the tissue graft comprises exposing the tissue graft to gamma irradiation.

14. The method of claim 12, further comprising freezing the tissue graft and the solution prior to sterilizing the tissue graft.

15. The method of claim 14, further comprising thawing the solution to the unfrozen state after sterilization and before storing the tissue graft.

16. The method of claim 1, wherein the solution is formed from one or more soluble salts of magnesium, calcium, sodium, or potassium.

17. The method of claim 16, wherein the solution is formed from magnesium chloride.

18. The method of claim 1, wherein a ratio of the chlorhexidine gluconate to the propylene glycol is about 1:50 by weight to about 1:2 by weight.

19. A method of using a tissue graft, the method comprising:
removing the tissue graft from a solution, wherein the tissue graft had been stored in the solution for a period of time of at least 24 hours while the solution was in an unfrozen state, the solution comprising chlorhexidine gluconate in an amount of about 0.0005% by weight to about 2% by weight; and
implanting the tissue graft in a human or non-human subject.

20. The method of claim 1, wherein the tissue graft comprises acellular nerve tissue.

21. The method of claim 1, wherein the solution further comprises magnesium chloride hexahydrate in addition to the chlorhexidine gluconate.

22. The method of claim 3, wherein the solution further comprises magnesium chloride hexahydrate in addition to the chlorhexidine gluconate.

* * * * *